Sept. 27, 1966   J. MARTIN   3,275,267
APPARATUS FOR CONTROLLING AIRCRAFT
Filed Nov. 30, 1964
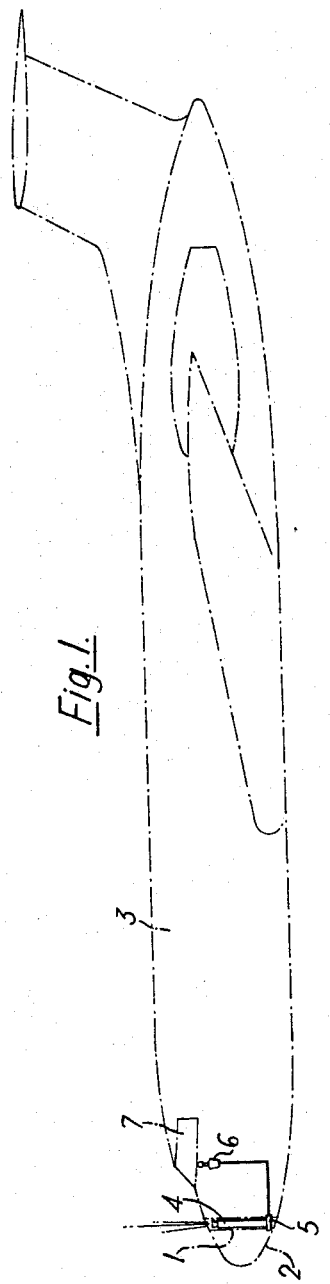
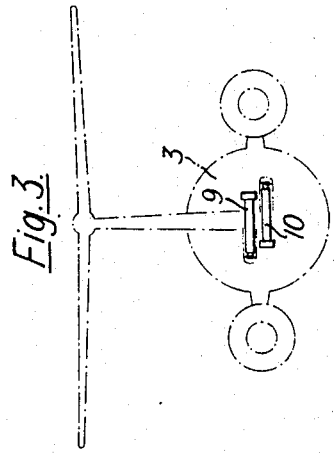
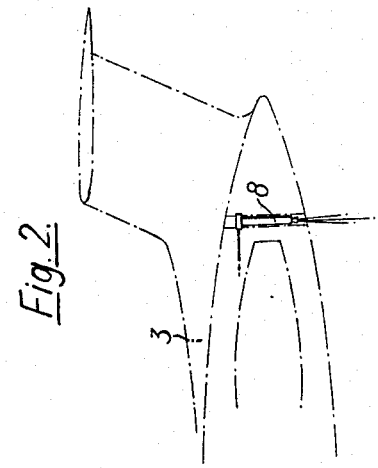
Inventor
JAMES MARTIN
By Kurt Kelman
AGENT

United States Patent Office 3,275,267
Patented Sept. 27, 1966

3,275,267
APPARATUS FOR CONTROLLING AIRCRAFT
James Martin, Southlands Manor, Southlands Road,
Denham, near Uxbridge, Middlesex, England
Filed Nov. 30, 1964, Ser. No. 414,532
Claims priority, application Great Britain, Dec. 12, 1963,
49,196/63
3 Claims. (Cl. 244—75)

This invention concerns a new or improved apparatus for controlling aircraft.

Certain modern aircraft, particularly those with a high tailplane configuration and with rear mounted engines, have a tendency to become unmanageable in a stall. In such stalled condition such aircraft fall towards the ground in a nose-up attitude at a greater rate than their forward velocity. As a result of this the engines become starved of air and the throttle has little or no effect. Furthermore, the control surfaces meet the air at such an angle that they are ineffective.

Thus, one object of this invention is to provide apparatus which will change the attitude of an aircraft when desired.

It is well-known that aircraft in a spin can also become extremely difficult to control and another object of this invention is to provide, when desired, apparatus for assisting the control of an aircraft in such a spin.

According to this invention there is provided apparatus for assisting in the control of a winged aircraft including at least one rocket motor secured to the fuselage of said aircraft in a position in which the thrust line of the motor is transverse to the longitudinal axis of thrust line of the aircraft, said rocket motor being spaced from the centre of gravity of such aircraft. The motor may be released from the fuselage by controls in the latter in the direction of the line of motor thrust.

When it is desired to assist the control of an aircraft in a stall said rocket motor or motors may be positioned towards the front of the aircraft and/or towards the tail of the aircraft to cause a nose-down pitching moment of the aircraft. Where, however, it is desired to use such rocket motor or motors to control a spinning aircraft, said motor or motors may be positioned at the nose and/or the tail of the aircraft so that the thrust line thereof is or are substantially horizontal (when the aircraft is in horizontal flight) and substantially perpendicular to the longitudinal axis or thrust line of the aircraft so that such rocket motor or motors on initiation produce a yawing moment.

By the use of such rocket motor or motors it is possible to cause the attitude of an aircraft to be changed in order that, for example, in the case of a stalling aircraft, the aircraft can be positioned nearer the horizontal such that the engines are not starved of air and so that the angle of incidence on the surfaces of the wings is such that lift is again obtained.

It will be appreciated that the form of rocket motor or motors, the position of such motor or motors and the controls therefor, can be varied in numerous ways, but three embodiments of apparatus according to this invention will now be described by way of example, and with reference to the accompanying drawings in which:

FIGURE 1 is a diagrammatic side view of an aircraft having a high tailplane and having the engines positioned at the rear thereof, such aircraft being provided with a single rocket motor positioned in the nose of such aircraft for use in assisting control of the aircraft in a stall;

FIGURE 2 is a fragmentary diagrammatic side view of the aircraft of FIGURE 1 showing a rocket motor positioned towards the tail of the aircraft for use in assisting control of the aircraft in a stall; and FIGURE 3 is a diagrammatic rear view of the aircraft of FIGURES 1 and 2 showing positioned in said aircraft a pair of rocket motors for use in assisting control of the aircraft in a spin.

In the embodiment of FIGURE 1 a vertical tubular housing 1 is provided in the nose 2 of the aircraft 3, such housing 1 being located upon, and perpendicular to, the aircraft thrust line or longitudinal axis, this housing 1 serving to accommodate a rocket motor 4. Within the housing there is provided an abutment or supporting member 5 upon which the rocket motor may apply its thrust to the aircraft 3.

In this embodiment the rocket motor 4 consists of a series of tubular containers of propellant interconnected by a common combustion chamber, such chamber having one or more nozzles positioned so that the gases are exhausted substantially vertically and upwardly when the aircraft is in horizontal flight.

The rocket motor 4 is of sufficient proportions to provide a thrust of several thousand pounds for a lengthy period. The thrust output of the rocket motor 4 may, of course, be varied depending upon the position of the thrust line thereof with respect to the centre of gravity of the aircraft and upon the size and weight of the aircraft 3.

Ignition of the rocket motor 4 can be effected in a number of different ways, but the preferred arrangement is to ignite the propellant by first firing an initiating cartridge. The firing of such an initiating cartridge is conveniently attended to by releasing a spring-biased firing pin, such release conveniently being caused by the withdrawal of a sear or, alternatively, by gas pressure. In this embodiment initiation of the rocket motor 4 and the subsequent control of the thrust from such rocket motor 4 is controlled by a manual control lever 6 in the cockpit 7 of the aircraft.

Very conveniently, this control lever 6 may be placed in one of three positions, the first position being a centre "off" position (where the lever would normally be locked to prevent inadvertent operation), a second position where the lever 6 is moved forwardly to initiate firing of the rocket motor, and a third position for terminating or at least reducing the thrust of the rocket motor if such termination or reduction of thrust becomes necessary.

Movements of the control lever 6 may be transmitted to the firing mechanism of the rocket motor 4 in several ways, such as, for example, mechanical means, i.e. direct communication between the rocket motor 4 from the control lever 6 by means of cables and/or rods etc., by gas pressure generated by a cartridge, by electro-mechanical means consisting, for example, of a solenoid adapted to extract the sear, or by any other suitable electrical means.

If, and when, it is desired to terminate or reduce the thrust of the rocket motor 4, the manual control lever 6 is positioned, as has been stated above, in the third position. Movement of the manual control lever 6 into this third position actuates, again in any suitable way, mechanism which would cause the instantaneous reduction of pressure within the combustion chamber of the rocket motor 4. This instantaneous reduction in pressure may be obtained by allowing the abutment or supporting member 5 to be withdrawn from behind the rocket motor 4 thereby permitting the rocket motor to jettison itself or, alternatively, cause the rocket motor nozzles(s) or another part of the rocket to open the combustion chamber of the rocket motor 4 to the atmosphere.

It will be seen from FIGURE 2 of the accompanying drawings that a rocket motor 8 is positioned in the tail of the aircraft. Such a rocket motor 8 is mounted and constructed in the same way as the aforementioned rocket motor 4 and could be provided in place of, or in addition to, the said rocket motor 4. Such rocket motor 8 would also be controlled by a lever positioned in the cockpit 7 of the aircraft. Where both rocket motors 4 and 8 are provided the single control lever 6 may be used to initiate and control both rocket motors 4, 8 simultaneously.

By initiation of either one of, or both of, said rocket motors 4, 8 said aircraft would be subjected to a pitching moment which would tend to cause the aircraft to be moved from a nose-up attitude towards a horizontal flight attitude.

To assist control of the aircraft in a spin a pair of rocket motors 9, 10 may be provided as shown in FIGURE 3. In FIGURE 3 such motors are positioned towards the tail of the aircraft but it should be appreciated that a further pair of motors may be provided towards the nose of the aircraft in place of, or in addition to, the rocket motors 9, 10.

These rocket motors 9, 10 are arranged so that the thrust generated thereby will cause a yawing moment to be applied to the aircraft to tend to cause either clockwise or anti-clockwise rotation of such aircraft.

Control and jettisoning of these rocket motors may be attended to in the various ways hereinbefore described with reference to rocket motors 4 and 8 of FIGURES 1 and 2 of the accompanying drawings.

I claim:
1. In a winged aircraft, in combination:
 (a) a fuselage;
 (b) a rocket motor;
 (c) securing means securing said motor to said fuselage in a position spaced from the center of gravity of said aircraft in which the thrust line of said motor is substantially perpendicular to the longitudinal axis of said aircraft; and
 (d) control means in said fuselage and operatively connected to said securing means for releasing said motor from said fuselage in a direction of said line of thrust.

2. In an aircraft as set forth in claim 1, said rocket motor being secured to a portion of said fuselage forward of said center of gravity, and said thrust line thereof extending upward.

3. In an aircraft as set forth in claim 1, said rocket motor being secured to a portion of said fuselage rearward of said center of gravity, and said thrust line thereof extending downward.

References Cited by the Examiner
UNITED STATES PATENTS

| | | | |
|---|---|---|---|
| 2,506,976 | 5/1950 | Tharratt | 244—58 X |
| 2,961,197 | 11/1960 | Hertel | 244—58 |

FOREIGN PATENTS 610,143　10/1948　Great Britain.

OTHER REFERENCES

Space/Aeronautics, February 1960, pages 46–49.

MILTON BUCHLER, *Primary Examiner.*
ANDREW H. FARRELL, *Examiner.*